J. LAUBE.
PROTECTIVE THREAD COVERING FOR AUTOMOBILE TIRES.
APPLICATION FILED MAR. 22, 1917.

1,273,792.

Patented July 23, 1918.

Inventor:
John Laube
by  *J. H. Geisler*
Attorney.

UNITED STATES PATENT OFFICE.

JOHN LAUBE, OF DEER ISLAND, OREGON.

PROTECTIVE TREAD-COVERING FOR AUTOMOBILE-TIRES.

1,273,792.  Specification of Letters Patent.  Patented July 23, 1918.

Application filed March 22, 1917. Serial No. 156,785.

*To all whom it may concern:*

Be it known that I, JOHN LAUBE, a citizen of the United States, and a resident of Deer Island, Columbia county, State of Oregon, have invented a certain new and useful Improvement in Protective Tread-Coverings for Automobile-Tires, of which the following is a specification.

My invention has for its object the providing of a rubber vehicle tire with a protective covering, and, further, to provide convenient means for securing the protective covering in place. It is further my object to make the protective covering with a reinforced tread portion, so that it may have greater wear, and to use bolt-and-nut means for fastening the sections of the protective covering end to end, and so arrange the parts that the nuts of the bolts will lie on the exterior surface of the reinforced tread of the protective covering; also to provide means which will keep the nuts from turning off the bolts.

The details of construction and operation of my invention are hereinafter fully described, reference being had to the accompanying drawings, in which.

$a$ represents the auto tire, $b$ the protective covering provided at its sides with beads $b'$, and on the tread with a reinforcement $c$.

Figure 1:
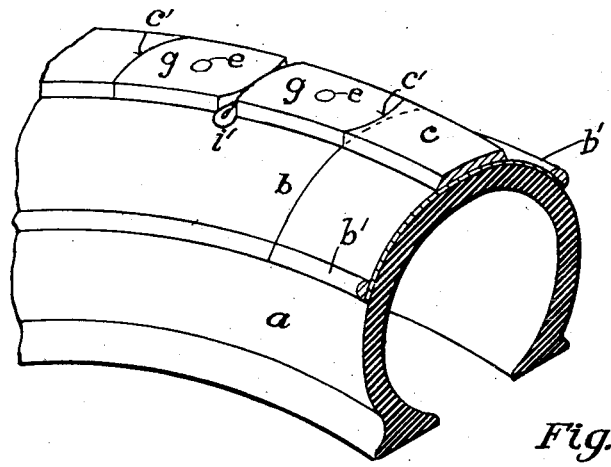
Figure 1 is a perspective view showing a section of a common rubber tire, to which one type of my protective covering is applied as in practice.
Figure 2:
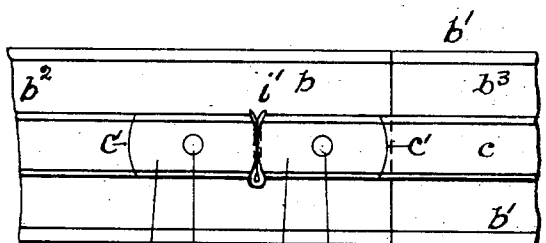
Fig. 2 is a top view of a section of my protective covering by itself.
Figure 3:
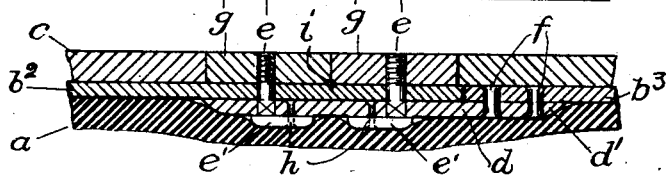
Fig. 3 is a longitudinal section taken approximately through the middle of Fig. 2.

Referring to Figs. 1, 2 and 3, the protective covering $b$ is made in sections, as may be convenient, and the abutting sections are fastened together by means of butt straps and bolts, as shown. The butt strap $d$ is preferably fastened at its end $d'$, for example, to the end $b^3$ of the protective covering; being secured to said end by rivets $f$. The free end of the butt strap $d$ is provided with holes through which are inserted the stud bolts $e$, $e$. In order to keep the latter from turning, each thereof is provided with an elongate head $e'$, through which head and the butt strap is inserted a rivet $h$. The end $b^2$ of the protective covering is provided with holes through which to insert the stud bolts $e$, and on each of the latter is threaded a nut $g$. To hold the nuts $g$ against turning, the top surface of the protective covering and said nuts at their inner lower corners are provided with companion grooves as $i$, in which to insert a cotter pin as $i'$, and operating to hold the nuts against turning on the stud bolts, as illustrated in Figs. 1 and 2.

In order to prevent as much dirt as possible from collecting in the cut-away portion of the reinforcement $c$, in which the nuts $g$ are located, I make the latter with convexed ends and the abutting faces of the tread $c$ concave, as shown at $c'$ in Figs. 1 and 2.

Figure 4:
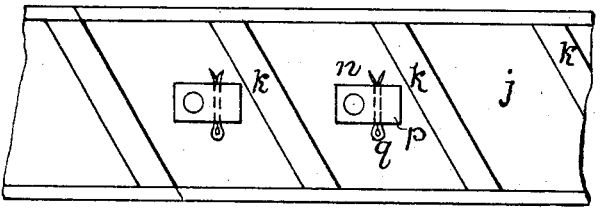
Fig. 4 is a top view showing a modification in the construction of my protective tire.
Figure 5:
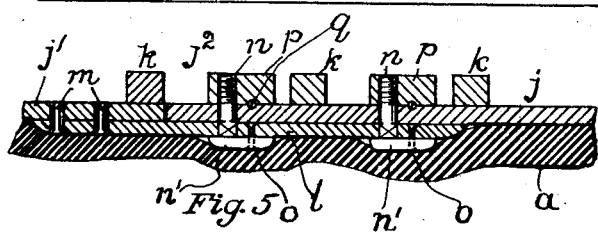
Fig. 5 is a longitudinal section taken approximately on the line central of Fig. 4.

Referring now to Figs. 4 and 5, in this instance the protective covering $j$ is made with diagonal cleats $k$ to prevent skidding; it being understood that the cleats of the protective covering applied on one wheel are arranged at an angle to those of the other wheel.

The means provided by me for fastening the abutting ends of the protective covering together are substantially the same as those already described. The end $j'$ of the protective covering has fastened to it one end of a butt strap $l$, by means of rivets $m$, $m$, and the free end of the butt strap is provided with perforations through which to insert stud bolts $n$, each provided with an elongate head which is riveted by a rivet $o$ to the strap to prevent the stud bolt from turning. On the stud bolt is threaded a nut $p$. The upper face of the protective covering and the under face of the nut $p$ are made with companion half grooves in which is inserted a cotter pin $q$.

I round off the ends of the butt strap $d$ or $l$ and also of the elongate heads of the stud bolts, so as to have no sharp corners to wear out the surface of the tire $a$ bearing against said parts.

I claim:

1. The combination with a sectional protective covering for vehicle tires, of means for fastening adjacent sections end to end comprising a strap underlying said ends, a stud bolt inserted through said strap and also through an end of the protective covering, means for holding the stud bolt against rotation, a nut threaded on the extremity of the stud bolt, and means for holding the nut against rotation on the bolt.

2. The combination with a sectional protective covering for vehicle tires, of means for fastening adjacent sections end to end comprising a strap underlying said ends, a stud bolt inserted through said strap and also through an end of the protective covering, the stud bolt being made with an elongated head, a rivet inserted through such head and the strap, a nut threaded on the extremity of the stud bolt, and means for holding the nut against rotation on the bolt.

3. The combination with a sectional protective covering for vehicle tires, of means for fastening adjacent sections end to end comprising a strap underlying said ends, a stud bolt inserted through said strap and also through an end of the protective covering, means for holding the stud bolt against rotation, a nut threaded on the extremity of the stud bolt, the nut and the protective covering being made with companion grooves, and a pin inserted in such grooves.

4. The combination with a sectional protective covering for vehicle tires, said covering provided with a reinforced tread, of means for fastening adjacent sections end to end comprising a strap underlying said ends, a stud bolt inserted through said strap and also through an end of the protective covering, means for holding the stud bolt against rotation, a nut threaded on the extremity of the stud bolt, means for holding the nut against rotation on the bolt, said nut being made with convexed ends, and the reinforced tread of the protective covering having a portion cut away to receive said nut.

5. The combination with a sectional protective covering for vehicle tires, said covering provided with a reinforced tread, of means for fastening adjacent sections end to end comprising a strap underlying said ends, a stud bolt inserted through said strap and also through an end of the protective covering, means for holding the stud bolt against rotation, a nut threaded on the extremity of the stud bolt, means for holding the nut against rotation on the bolt, said nut being made with convexed ends, the reinforced tread of the protective covering having a portion cut away to receive said nut, and being made with concave faces where abutting with said convexed ends of the nut.

6. The combination with a sectional protective covering for vehicle tires, of means for fastening adjacent sections end to end comprising a strap underlying said ends and permanently fastened to one thereof, a stud bolt inserted through the free end of said strap and also through an end of the protective covering, means for holding the stud bolt against rotation, and a nut threaded on the extremity of the stud bolt.

7. The combination with a sectional protective covering for vehicle tires, of means for fastening adjacent sections end to end comprising a strap underlying said ends and permanently fastened to one thereof, a stud bolt inserted through the free end of said strap and also through an end of the protective covering, means for holding the stud bolt against rotation, a nut threaded on the extremity of the stud bolt, and means for holding the nut against rotation on the bolt.

8. The combination with a sectional protective covering for vehicle tires, said covering provided with a reinforced tread, of means for fastening adjacent sections end to end comprising a strap underlying said ends and permanently fastened to one thereof, a stud bolt inserted through the free end of said strap and also through an end of the protective covering, the stud bolt being made with an elongated head, a rivet inserted through such head and the strap, a nut threaded on the extremity of the stud bolt, the nut and the protective covering being made with companion grooves, a pin inserted in such grooves, and the reinforced tread of the protective coverings having a portion cut away to receive said nut.

9. The combination with a sectional protective covering for vehicle tires, said covering provided with a reinforced tread, of means for fastening adjacent sections end to end comprising a strap underlying said ends and permanently fastened to one thereof, a stud bolt inserted through the free end of said strap and also through an end of the protective covering, the stud bolt being made with an elongated head, a rivet inserted through such head and the strap, a nut threaded on the extremity of the stud bolt, the nut and the protective covering being made with companion grooves, a pin inserted in such grooves, said nut being made with convexed ends, the reinforced tread of the protective covering having a portion cut away to receive said nut, and being made with concave faces where abutting with said convexed ends of the nut.

10. In a sectional protective covering for tires, of means for fastening adjacent sections end to end comprising a strap underlying the ends and permanently fastened to one thereof, a stud-bolt inserted through the free end of said strap and through the other end of the protective covering, a nut threaded on the extremity of said bolt, means for holding the bolt against rotation, said nut being made with convex ends, the protective covering being made with corresponding concave spaced portions to receive said nut, and means for holding the nut against rotation on the bolt.

11. In a sectional protective covering for tires, of means for fastening adjacent sections end to end comprising a strap underlying the ends and permanently fastened to one thereof, a stud bolt inserted through the free end of said strap and through the other end of the protective covering, a nut threaded on the extremity of said bolt, the bolt being made with an elongated head, a rivet inserted through such head and the strap, said nut being made with convex ends, the protective covering being made with corresponding concave spaced portions to receive said nut, and means for holding the nut against rotation on the bolt.

12. In a sectional protective covering for tires, of means for fastening adjacent sections end to end comprising a strap underlying the ends and permanently fastened to one thereof, two stud bolts inserted through the free end of said strap and through the other end of the protective covering, nuts threaded on the extremity of said bolts, means for holding the bolts against rotation, said nuts being made with convex ends, the protective covering being made with corresponding concave spaced portions to receive said nuts, the abutting faces of the nuts and the adjacent part of the protective covering being made with a recess, and a cotter pin inserted in such recess.

JOHN LAUBE.

Copies of this patent may be obtained for five cents each, by addressing the "Commissioner of Patents, Washington, D. C."